United States Patent [19]

Pignataro

[11] 4,023,267
[45] May 17, 1977

[54] METHOD OF FABRICATING A MAGNETIC CHUCK

[75] Inventor: Dominic Francis Pignataro, Shrewsbury, Mass.

[73] Assignee: Walker Magnetics Group, Inc., Worcester, Mass.

[22] Filed: May 28, 1976

[21] Appl. No.: 691,040

[52] U.S. Cl. .................................. 29/416; 29/469; 29/527.5; 29/527.6; 279/1 M; 335/289
[51] Int. Cl.² ........................................ B23P 17/04
[58] Field of Search ............ 29/412, 416, 428, 469, 29/527.1, 527.5, 527.6; 335/289; 279/1 M; 228/135, 189

[56] References Cited

UNITED STATES PATENTS

| | | | |
|---|---|---|---|
| 2,882,458 | 4/1959 | Anderson et al. | 335/289 |
| 2,918,610 | 12/1959 | Briggs | 279/1 M |
| 3,078,565 | 2/1963 | Sanders | 29/527.6 |
| 3,144,712 | 8/1964 | Ripling | 29/527.6 |

Primary Examiner—Victor A. DiPalma
Attorney, Agent, or Firm—Kenway & Jenney

[57] ABSTRACT

The magnetic chuck disclosed herein is of the interlocking finger type and substantial components thereof are fabricated by making parallel oblique cuts in conventional bar stock thereby to generate a succession of parallelogram-shaped pieces. A series of the parallelogram pieces are assembled with alternate pieces being reversed so that they overlap only over a common triangular area with adjacent parallelogram pieces being separated by interleaved triangular spacers. The projecting fingers provided by such an assembly may be then mated with other similar or half-similar pole-piece units to form an interlock magnetic chuck top plate.

4 Claims, 14 Drawing Figures

METHOD OF FABRICATING A MAGNETIC CHUCK

BACKGROUND OF THE INVENTION

The present invention relates to magnetic chucks and more particularly to a method of fabricating an interlock top plate assembly for such a chuck.

Electrically energized magnetic chucks are frequently used for holding iron or steel work pieces during machining operations. One popular type of chuck is a so-called interlock chuck in which a plurality of magnetic fingers extend from different portions of a coil core and the fingers of different polarity are interlaced so as to provide a convoluted or highly distributed magnetic gap appropriate for holding parts of different sizes, shapes and thicknesses.

Various techniques have been employed for making the magnetic finger units employed in these chucks. In one prior art construction, magnetic fingers having a flowing or curved shape have been flame cut from flat stock and assembled with spacers. In another construction, described in German Pat. No. 1,147,459, a solid plate is flame cut in a zigzag pattern with the angle of the cutting head being varied so as to provide an inclined gap, the inclination of the gap being such that the gap is highly convoluted on the top surface and at the bottom surface of the plate essentially follows the usual, essentially straight gap in the coil form. Other complex pole piece configurations have been constructed by casting the shapes using conventional foundry techniques, e.g. sand casting.

Among the several objects of the present invention may be noted the provision of a method for relatively easily fabricating top plate assemblies for interlock magnetic chucks; the provision of such a method which utilizes readily available, stock materials; the provision of such a method which yields a pole piece assembly of highly desirable magnetic properties; and the provision of such a method which is relatively simple and inexpensive. Other objects and features will be in part apparent and in part pointed out hereinafter.

SUMMARY OF THE INVENTION

Briefly, the method of the present invention utilizes elongate magnetizable bar stock of rectangular cross-section in the fabrication of the magnetic fingers. A series of parallel cuts are made in the bar stock on a bias to its length, thereby to form a succession of flat, parallelogram-shaped pieces. A series of the parallelogram-shaped pieces are assembled with alternate pieces being reversed so that the pieces overlap only over a common triangular area. Adjacent parallelogram pieces are separated by flat, triangular spacers which correspond to the overlapping portions of the parallelogram shapes and are interleaved therebetween. The assembled parallelogram pieces and spacers are fusion-joined, e.g. by welding, to form a cohesive pole piece unit. The pole piece unit so formed is then assembled with at least two other pole piece units which are at least half similar to the original pole piece unit. The assembly is such that the projecting portions of the parallelogram pieces of the respective units are interleaved, but spaced, thereby forming a top plate assembly for an interlock magnetic chuck. Preferably, a non-magnetic material is cast into the space between the interleaved fingers.

BRIEF DESCRIPTION OF THE DRAWINGS

Corresponding reference characters indicate corresponding parts throughout the several views of the drawings.

DESCRIPTION OF THE PREFERRED EMBODIMENT

Figure 9:
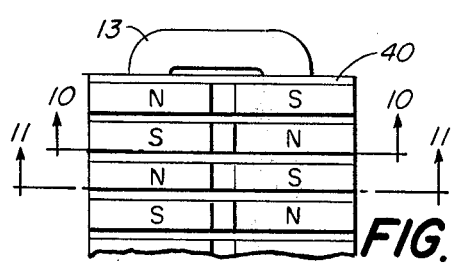
FIG. 9 is a diagrammatic top view of a completed and assembled magnetic chuck of the type illustrated in FIG. 1.
Figure 10:
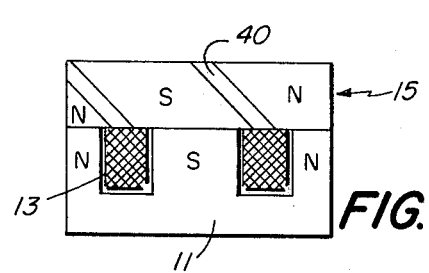
FIG. 10 is a cross-section, taken substantially on the line 10—10 of FIG. 9, showing the manner in which the chuck top plate is combined with a magnetic coil and core assembly to form a completed magnetic chuck.
Figure 11:
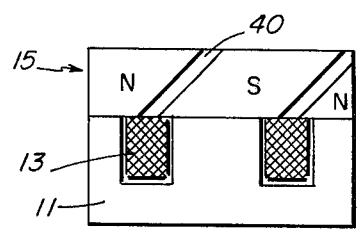
FIG. 11 is a sectional view on the line 11—11 of FIG. 9, showing an adjacent polarity position.

In order to describe the magnetic arrangement generally, it is useful to first refer briefly to FIGS. 9–11. As illustrated in FIG. 9, the top surface of the interlock form of magnetic chuck comprises at least two series of pole faces, alternate pole faces in each series being of opposite magnetic polarity as indicated in the drawing. Rather than utilizing a complex winding pattern to generate pole pieces of alternating polarity, the interlock chuck construction employs what may be termed "magnetic fingers" which extend from the poles of a relatively conventional coil core construction.

In the construction illustrated in FIGS. 9–11, an essentially conventional E-core 11 is employed which receives a single coil 13 in the hollows of the E-shape. Over the core and winding is placed the top plate 15 which provides a multiplicity of magnetic paths which can be interlaced to establish the pole faces of alternating polarity illustrated in FIG. 9.

In the embodiment illustrated in FIGS. 9–11, all of the south (S) pole faces shown in FIG. 9 originate from the middle leg of the E-core 11. The magnetic structure coupled to this middle leg is constructed, as described in greater detail hereinafter, so as to provide a series of magnetic fingers, successive one of which are directed first to one side (as shown in FIG. 10) and then to the other side (as shown in FIG. 11). Half the north (N) poles, i.e. those in one row take their flux from one of the outside arms of the E-core while the north pole faces in the other series take flux from the other outer arm of the E-core.

Figure 2:
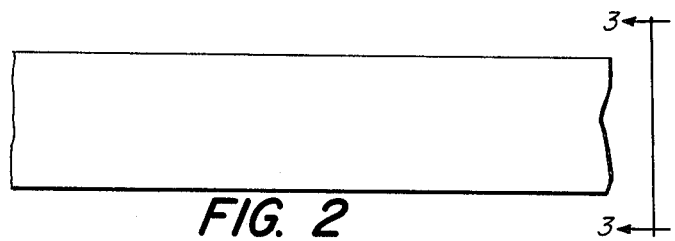
FIG. 2 is a plan view of common bar stock utilized in forming magnetic fingers employed in the chuck of FIG. 1.
Figure 3:
FIG. 3 is a cross-sectional view of the bar stock of FIG. 2 taken substantially on the line 3—3 of FIG. 2.
Figure 4:
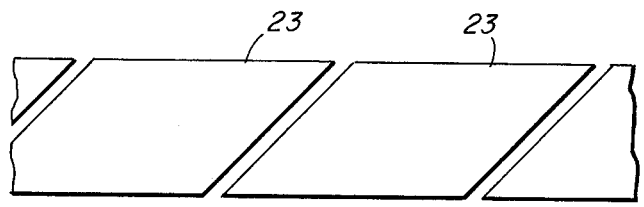
FIG. 4 is an illustration showing how the bar stock of FIG. 2 is repeatedly cut on a bias to provide parallelogram-shaped pieces employed in the magnetic chuck.

As suggested previously, the interlock magnetic circuit arrangement is not novel. Rather, the present invention is concerned with a particularly advantageous method of fabricating such a magnetic circuit structure. In accordance with the method of the present invention, magnetic fingers suitable for the interlocking construction are fabricated from bar stock 21 of rectangular cross-section. Such stock is illustrated in FIGS. 2 and 3. The actual material is selected to be relatively permeable and easily worked, e.g. a mild steel. By making a series of parallel cuts in the bar stock on a bias to its length, a succession of flat, parallelogram-shaped pieces 23 are formed. Such a cutting operation is diagrammatically illustrated in FIG. 4.

Figure 5:
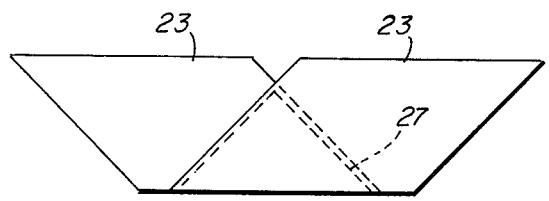
FIG. 5 illustrates the manner in which a succession of the parallelogram-shaped pieces are assembled with alternate pieces being reversed.
Figure 6:
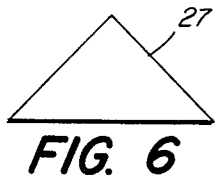
FIG. 6 illustrates the triangular shape of a spacer employed between adjacent parallelogram-shaped pieces in the assembly of FIG. 5.

A series of the parallelogram-shaped pieces 23 are assembled with alternate pieces being reversed so that the reversed pieces overlap only over a common triangular area. This arrangement is illustrated in FIG. 5. The assembly includes the placing of triangular spacers 27 between adjacent parallelogram pieces, the spacer shape being separately illustrated in FIG. 6. The spacers 27, being flat triangular elements, may be also cut from flat magnetizable bar stock, e.g. by making bias cuts at alternating angles.

Figure 1:
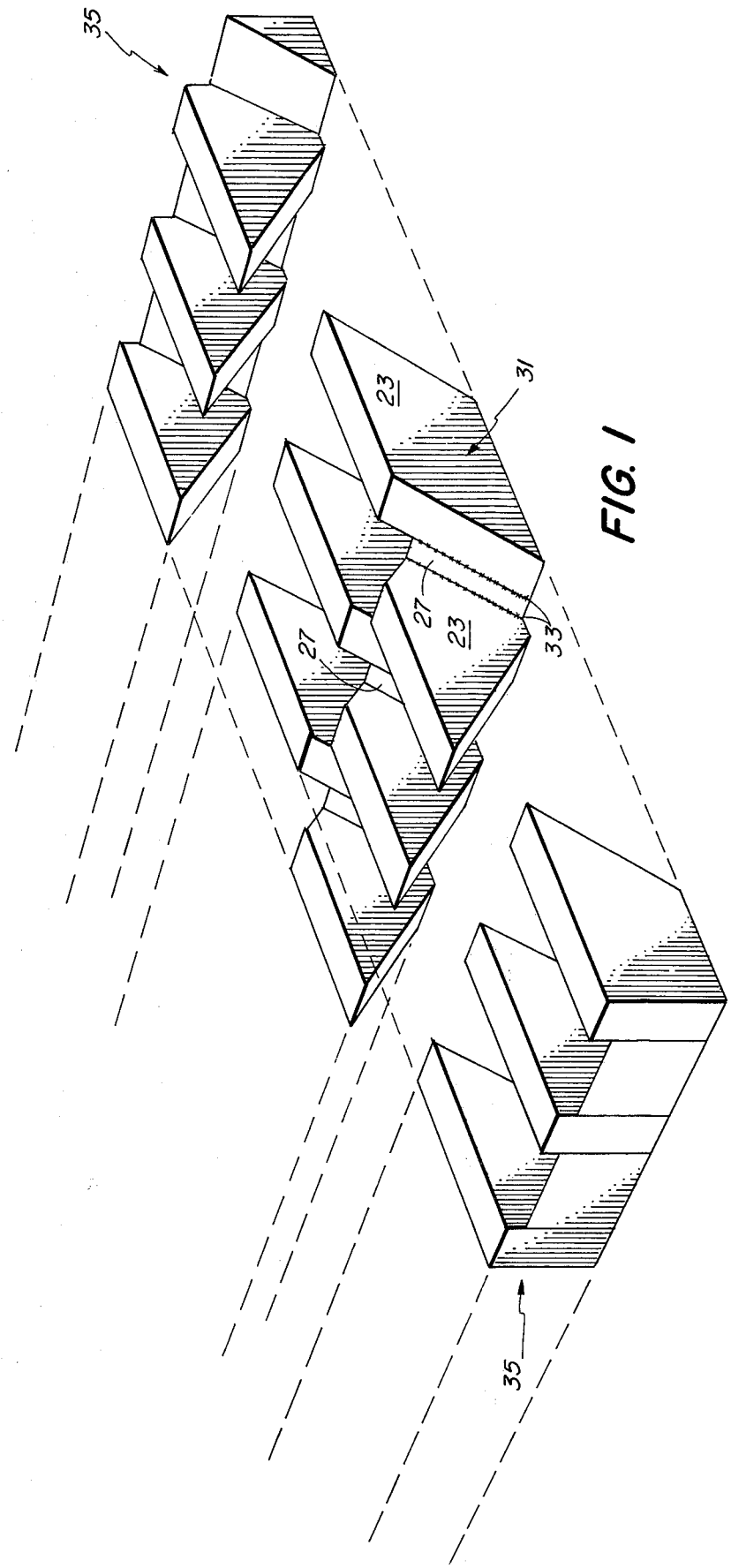
FIG. 1 is a perspective view, with parts separated, of portions of an interlock magnetic chuck top plate, fabricated in accordance with the present invention.
Figure 8:
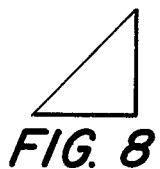
FIGS. 7 and 8 illustrate magnetic finger and spacer pieces used in forming a pole piece unit which is half-similar to that illustrated in FIG. 5.
Figure 7:
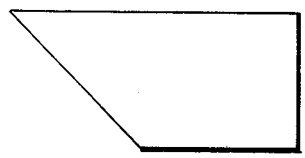

The joints between the assembled parallelogram pieces and spacers are fusion joined, e.g. welded, so that the assembly forms a cohesive unit, i.e. as indicated at 31 in FIG. 1, the welds being designated by reference character 33. As will be understood by those skilled in the art, a pole piece unit, such as that indicated at 31 in FIG. 1, may be mated on either side with another unit which is essentially similar or with a unit which may be conveniently termed as being half-similar. To form a top plate for use in a relatively simple chuck construction with only a single coil, e.g. as illustrated in FIGS. 9–11, the pole piece unit 31 is mated with a pair of half-similar units, designated 35, as illustrated in FIG. 1. To a first approximation, each half-similar unit 35 may be considered as the arrangement resulting from cleaving the assembly 31 on a central plane extending along the length of the assembly. It is, however, more convenient to assemble the equivalent magnetic structure using pieces already shaped in correspondence with the desired end configuration. Appropriate shapes are illustrated in FIGS. 7 and 8. As the half-similar unit has fingers, designated 37, projecting in one direction only, the spacers, designated 39, may be of a thickness equivalent to a finger plus two spacers of the type used in the center unit 31.

To complete the top plate assembly after the central pole piece unit 31 and the mating half-similar pole piece units of 35 and 37 are brought together in interlocking relationship, the assembly is preferably cast into a non-magnetic matrix material, e.g. a non-magnetic alloy such as type metal as indicated at 40 in FIGS. 9–11. This gives a continuous top surface protecting the coil and also locks the pole piece units together in fixed relationship and facilitates their assembly with the coil and base core units in conventional manner, e.g. by bolting or resin bonding. A resin could be used in place of the type metal. After casting, it is typically desirable to machine at least the top surface to obtain a flat smooth surface. The original dimensions of the elements are preferably chosen to permit this and still obtain the desired finished dimensions.

As will be understood by those skilled in the art, the present invention provides a particularly simple, flexible and straightforward method of fabricating a chuck of the interlock type using standard materials and stock. Further, since the interlaced fingers are themselves in the form of parallelograms, the cross-section available for the magnetic flux remains constant throughout the length of the finger, making efficient use of the material.

Figure 12:
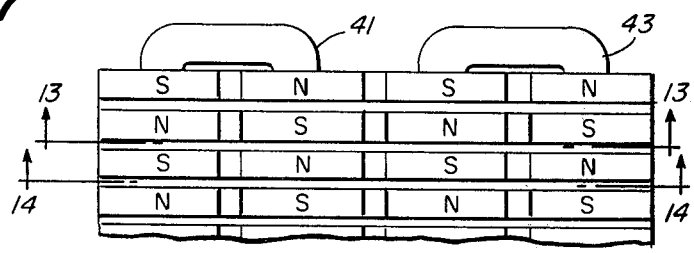
FIG. 12 is a diagrammatic top view of a two-coiled magnetic chuck.
Figure 13:
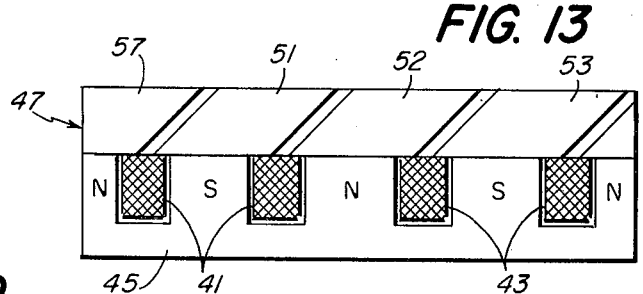
FIG. 13 is a sectional view, taken substantially on the line 13—13 of FIG. 12.
Figure 14:
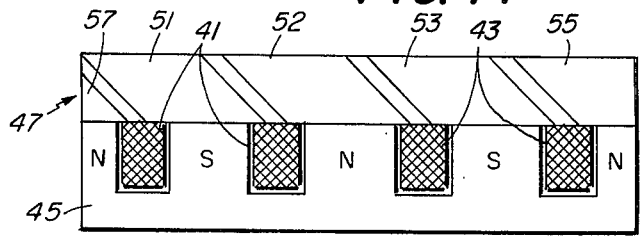
FIG. 14 is a sectional view, taken substantially on the line 14—14 of FIG. 12.

As indicated previously, a magnetic unit such as that indicated at 31 in FIG. 1 can be mated, not only with half-similar units, but also with essentially similar units to develop a repeating pattern. Such a repeating pattern can be utilized to fabricate interlock chuck pole plates of larger size, i.e. using multiple coils. An overall assembly utilizing two coils is diagrammatically illustrated in FIGS. 12–14. The two coils are indicated at 41 and 43. The magnetic base core 45 used with two coils has five legs or upstanding portions as compared with the three legs of the more conventional E-core of FIGS. 10 and 11.

The top plate 47 used with this two-coil base core employs three pole piece units 51–53, each of which is essentially similar to the pole piece unit 31 of FIG. 1, and employs also complementary half-similar pole piece units 55 and 57 which are analogous to the half-similar pole piece units 35 and 37 of the FIG. 1 embodiment. Obviously, the pattern can be extended indefinitely and each version partakes of the advantages outlined for the original construction as to ease of fabrication and assembly.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of fabricating a top plate assembly for an interlock magnetic chuck, said method comprising:
   providing elongate magnetizable bar stock of rectangular cross-section;
   making a series of parallel cuts in said bar stock on a bias to its length thereby to form a succession of flat, parallelogram-shaped pieces;
   providing a succession of flat triangular spacers of magnetizable stock, each corresponding to a minor portion of the parallelogram shape;
   assembling a series of said parallelogram pieces with alternate pieces being reversed so that the pieces overlap only over a common triangular area, adjacent parallelogram pieces being separated by spacers which are interleaved with the parallelogram pieces at said overlapping triangular areas;
   fusion joining the assembled parallelogram pieces and spacers to form a cohesive pole-piece unit; and
   assembling said pole-piece unit with at least two other pole-piece units which are at least half similar to the first said pole-piece unit with the projecting parllelogram portions of the respective units being interleaved but spaced thereby to form a top plate assembly for an interlock magnetic chuck.

2. The method as set forth in claim 1 wherein the assembled units are cast together in non-magnetic material to present a continuous top surface.

3. The method as set forth in claim 2 wherein, after casting, the top and bottom surfaces of the assembly are cut back to provide flat surfaces despite any minor mis-registration of the elements of the assembly.

4. The method of fabricating a top plate assembly for an interlock magnetic chuck which comprises forming an odd number of pole piece units as set forth in claim 1, one of said units being assembled with the other two as set forth in the last paragraph of claim 1, the opposite sides of the other two being assembled with half-similar units, thereby to form a top plate assembly appropriate for use in a multi-coil magnetic chuck.

* * * * *